United States Patent [19]

Bifani et al.

[11] 4,108,317
[45] Aug. 22, 1978

[54] CONTINUOUS LAYING OF PIPES OF LARGE DIAMETER

[75] Inventors: Alberto Giovanni Bifani; Giorgio Maria Bertolino, both of Turin, Italy

[73] Assignee: Fiat-Allis Macchine Movimento Terra S.p.A., Lecce, Italy

[21] Appl. No.: 789,023

[22] Filed: Apr. 20, 1977

[30] Foreign Application Priority Data

May 3, 1976 [IT] Italy .................. 68072 A/76

[51] Int. Cl.² .......................................... B66C 23/72
[52] U.S. Cl. ................ 214/1 PA; 212/8 B; 214/142; 214/152
[58] Field of Search ............ 214/1 PA, 142, 1 P, 214/15 Z; 212/8 R, 8 B, 48, 49

[56] References Cited
U.S. PATENT DOCUMENTS

| 3,501,021 | 3/1970 | Schreier | 212/49 |
| 3,955,684 | 5/1976 | Novotny | 212/48 |

Primary Examiner—Robert G. Sheridan
Assistant Examiner—George F. Abraham
Attorney, Agent, or Firm—August E. Roehrig, Jr.; Harvey W. Rockwell; Robert A. Brown

[57] ABSTRACT

A method of and apparatus for the continuous laying of pipe utilizing a plurality of counterbalanced pipe-laying vehicles wherein each pipe-laying vehicle has a movable-arm lifting crane for maneuvering pipe and a movable-arm balancing crane to effect counterbalancing during pipe-laying operation. The lifting arm and the balancing arm are supported on opposite sides of the pipe-laying vehicle such that the lifting arm may be attached to a pipe and the balancing arm may be attached to a counterweight. A second self-propelled vehicle is positioned adjacent to each pipe-laying vehicle such that the movable-arm balancing crane can be attached thereto so that the attached vehicle functions as a counterweight for the pipe-laying vehicle during pipe-laying operation.

6 Claims, 2 Drawing Figures

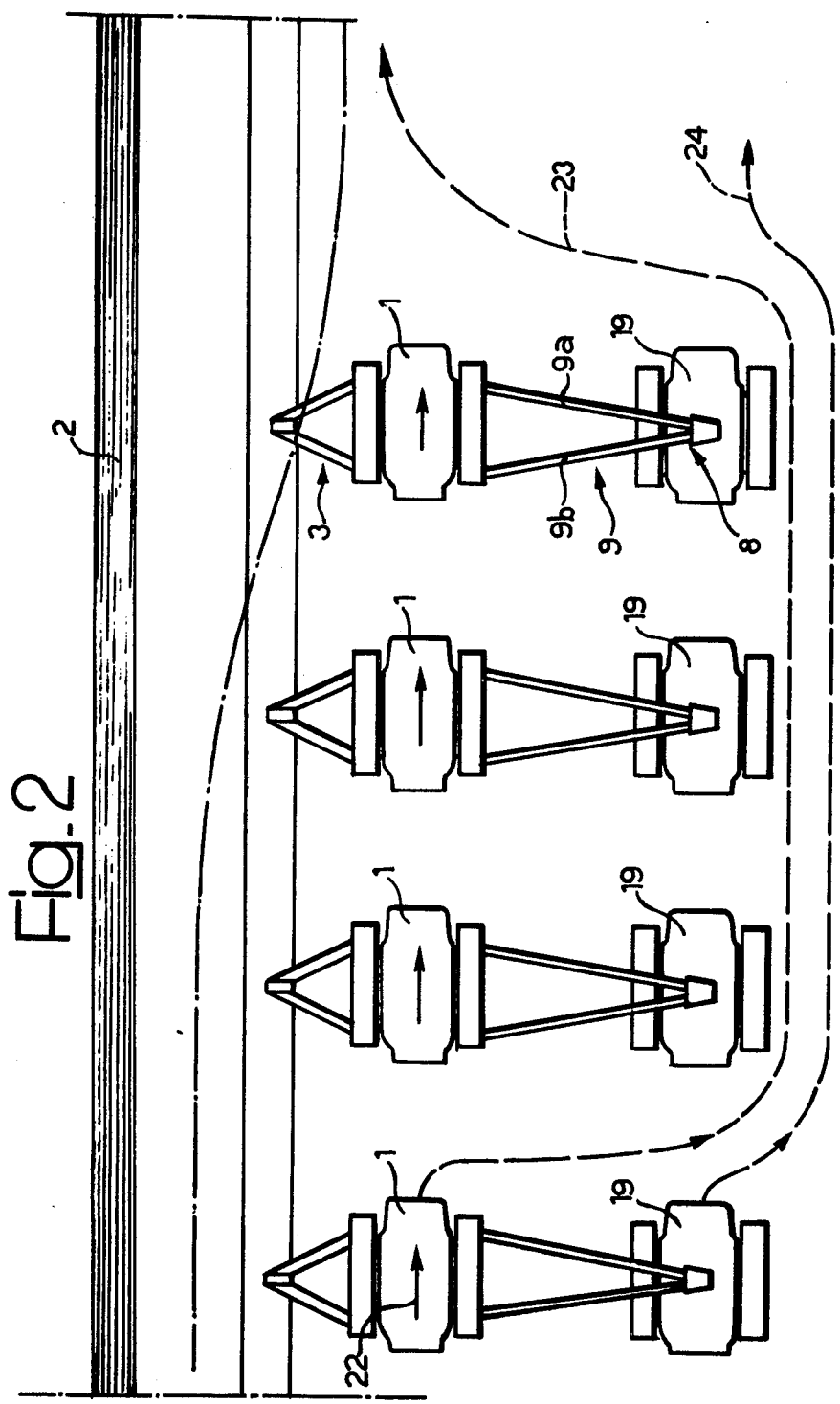

CONTINUOUS LAYING OF PIPES OF LARGE DIAMETER

BACKGROUND OF THE INVENTION

This invention relates in general to pipe laying equipment and, in particular, to a method of and apparatus for continuously laying pipes of large dimensions.

More specifically, but without restriction to the particular use which is shown and described, this invention relates to a method of and apparatus for continuously laying large dimension pipe wherein two self-propelled vehicles are utilized with one of the vehicles having two movable-arm cranes, one for maneuvering the pipe and another for attachment to the second self-propelled vehicle which functions as a counterweight during pipe laying operation.

The use of self-propelled counterweighted vehicles for various vehicle-mounted implements is well known. Some typical examples of such vehicles are disclosed in U.S. Pat. Nos. 3,815,478; 3,851,712; and 3,853,231; and the references cited therein. Each of the vehicles utilizes various counterweight apparatus and counterweight actuating systems for balancing the vehicle during operation of the various vehicle-mounted implements. While the systems described and disclosed therein may be satisfactory for certain purposes, they all add a great deal of weight to the vehicle, increase vehicle size, and decrease the operational speed of the vehicle when the vehiclemounted implement is not being utilized caused by the uneven distribution of the attached counterweight.

It is, therefore, an object of this invention to improve methods of and apparatus for laying pipes by self-propelled vehicles.

Another object of this invention is to increase operational capacity of pipe laying vehicles.

It is another object of this invention to increase operational speed of pipe-laying vehicles.

These and other objects are obtained in accordance with the present invention wherein there is provided a pipe-laying vehicle having a movable-arm lifting crane for laying pipe and a movable-arm balancing crane for operative attachment to a counterweight. The counterweight for balancing the pipe-laying vehicle during operation is provided by a second self-propelled vehicle attachable to and detachable from the movable-arm balancing crane such that counter-balancing is effected during pipe-laying operation, but may be detached during other operation or movement of the pipe-laying vehicle.

DESCRIPTION OF THE DRAWINGS

Further objects of the invention together with additional features contributing thereto and advantages accruing therefrom will be apparent from the following description of a preferred embodiment of the invention which is shown in the accompanying drawing with like reference numerals indicating corresponding parts throughout, wherein:

FIG. 2 is a schematic plan view of a line of twin-crane vehicles and their counterweight vehicles during pipe-laying operation.

DESCRIPTION OF THE PREFERRED EMBODIMENT

Figure 1:
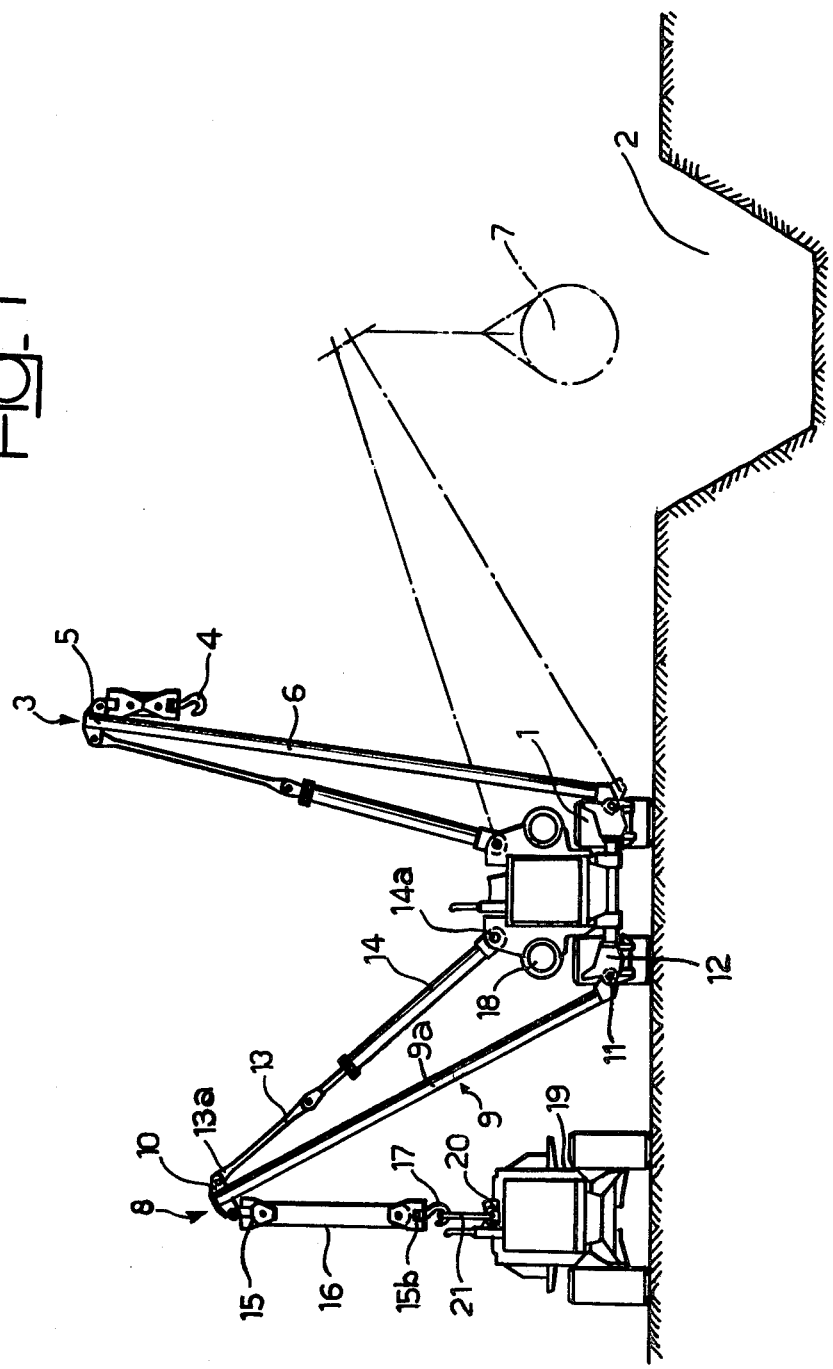
FIG. 1 is a front profile view of a twincrane vehicle with one lifting crane supporting a pipe section to be maneuvered into position and the other balancing crane attached to a second vehicle acting as a counterweight.

Referring now to the drawings, there is shown in FIG. 1, for example, a self-propelled vehicle 1 of the type utilizing an endless track and referred to as a crawler tractor. The vehicle 1 has secured on one side thereof a movable-arm lifting crane 3 provided with a hook 4 shown positioned at a free end 5 of a movable arm 6. The hook arrangement 4 is provided for attachment to a cable or the like encircling a pipe section 7 shown in phantom. On the opposite side of the crawler tractor 1 is mounted a second movable-arm balancing crane 8 which functions to connect or couple a counterweight for balancing the moment applied to the crawler tractor 1 by the laterally suspended pipe section 7 during pipe-laying operation. The balancing crane 8 has a rigid supporting arm 9 formed by two shafts or struts 9a and 9b (best seen in FIG. 2) diverging at the base and fixed at their opposite end to a single plate 10. The arm 9 is pivoted at its base to the track-carrying structure or frame 12 of the tractor about an axis 11. The plate 10 has coupled thereto the end 13a of a shaft 13 of a hydraulic jack having a cylinder 14 pivoted at 14a to the crawler tractor 1.

The arm 9 is pivotally moved about the axis 11 by the action of the hydraulic jack. A pulley 15 is attached to the plate 10 and includes a cable 16 supporting a second pulley 15b. A hook 17 is carried by the second pulley 15b to engage a counterweight which comprises a second self-propelled vehicle or, as illustrated, a crawler tractor 19. A winch 18 mounted on the pipe-laying crawler tractor 1 is operatively connected to the pulley system for winding and unwinding the cable 16.

The movable-arm lifting crane 3 can be of any type, but as illustrated, is of the same overall construction as the movable-arm balancing crane 8 and, therefore, is not described in detail. Therefore, the pipe-laying crawler tractor 1 can operate on one or the other sides of a trench 2 according to whether the counterweight is to be applied to the crane 8 or the crane 3. For further details concerning the structure of such a crawler tractor, reference is made to Italian Pat. No. 1,011,653 assigned to the same assignee as the present application, the disclosure of which is herein incorporated by reference.

The vehicle 19, illustrated as a crawler tractor, is of the same type as the crawler tractor 1 without the cranes 3 and 8 attached. A hook 20 is provided on the upper portion of the crawler tractor 19 to which a cable 21, or any other convenient equivalent, can be attached to enable the crawler tractor 19 to be coupled to the hook 16 of the balancing crane 8.

A method of pipe laying utilizing a plurality of crawler tractors 1 and 19 will now be described by way of example. As illustrated in FIG. 2, a line of twin-crane crawler tractors is positioned laterally of a trench 2 in which a pipe line is to be located. The tractors are aligned in the pipe-laying direction, indicated by arrows 22, and are spaced laterally from the trench 2 in which the pipe (the center line of which is shown) is being laid. The crane 3 of each tractor 1 supports a section 7 of the pipe to be laid, and the balancing crane 8 of each tractor 1 is attached to a tractor 19 which functions as a counterweight.

When the pipe section supported by the rearmost tractor of the series of tractors (the tractor illustrated at the left in FIG. 2) has been duly laid, the tractor counterweight 19 is detached from the hook 17 of the associated balancing crane 8. Both tractors 1 and 19 are thereby free to move independently under their own power to the head of the line as illustrated by the broken arrows 23 and 24 respectively. At the head of the line, the lifting crane 3 of tractor 1 is attached to a forward pipe section which is to be placed in the trench 2, and the hook 17 of the balancing crane 8 is attached to the counterweight tractor 19 to counter-balance the tractor 1 during pipe laying operation. This process is then repeated along the direction of the pipe laying operation until the work is completed.

While the invention has been described with reference to a preferred embodiment, it will be understood by those skilled in the art that various changes may be made and equivalents may be substituted without departing from the scope of the invention. In addition, many modifications may be made to adapt a particular situation to the teachings of the invention without departing from the essential scope thereof. Therefore, it is intended that the invention not be limited to the particular embodiment discloses as the best mode contemplated for carrying out this invention, but that the invention will include all embodiments falling within the scope of the appended claims.

What is claimed is:

1. Apparatus for laying pipe comprising
   a first self-propelled vehicle having supported thereon lifting means for engaging an object to be lifted and moved from one position to another position,
   said first self-propelled vehicle also having supported thereon balancing means for engaging a counterweight to counterbalance said vehicle when said lifting means engages an object during lifting and moving of the object from one position to another position, and
   a counterweighting second self-propelled vehicle having supported thereon means for detachably engaging the balancing means of said first self-propelled vehicle to form a counterweight for counterbalancing said first self-propelled vehicle when lifting and moving an object from one position to another position.

2. The apparatus of claim 1 wherein said lifting means for engaging an object to be lifted and moved from one position to another position and said balancing means for engaging a counterweight to counterbalance said vehicle during lifting and moving of the object are interchangeable.

3. The apparatus of claim 2 wherein said lifting means and said balancing means each comprise a movable-arm lifting crane.

4. The apparatus of claim 3 wherein each said moveablearm lifting crane includes
   a winch carried by said first self-propelled vehicle and having one end of a cable attached thereto and the other end of said cable operatively connected to a pulley system, and
   a movable lift arm carried at one end by said first self-propelled vehicle with the other end thereof supporting said cable between the ends thereof.

5. A method of continuously laying pipe utilizing at least two self-propelled vehicles comprising the steps pf
   engaging an object to be lifted and moved from one position to another position by lifting means carried by a first self-propelled vehicle,
   engaging a counterweighting second self-propelled vehicle to counterbalance said first self-propelled vehicle during lifting and moving of the object, and
   lifting and moving the object from one position to another position.

6. The method of claim 5 further including the step of disengaging the counterweighting second self-propelled vehicle from said first self-propelled after lifting and moving the object so that both of said self-propelled vehicles can move independently.

* * * * *